United States Patent
Kanan

(10) Patent No.: US 9,741,225 B1
(45) Date of Patent: Aug. 22, 2017

(54) SAFETY DETECTION SYSTEM AND METHOD

(71) Applicant: Abu Dhabi University, Abu Dhabi (AE)

(72) Inventor: Riad Kanan, Abu Dhabi (AE)

(73) Assignee: Abu Dhabi University, Abu Dhabi (AE)

( * ) Notice: Subject to any disclaimer, the term of this patent is extended or adjusted under 35 U.S.C. 154(b) by 0 days.

(21) Appl. No.: 15/140,748

(22) Filed: Apr. 28, 2016

(51) Int. Cl.
    *G08B 21/00*    (2006.01)
    *G08B 21/02*    (2006.01)
    *G01S 3/02*     (2006.01)
    *G01S 3/80*     (2006.01)

(52) U.S. Cl.
    CPC ............ *G08B 21/0266* (2013.01); *G01S 3/02* (2013.01); *G01S 3/80* (2013.01)

(58) Field of Classification Search
    CPC .......... G08B 21/0266; G01S 3/80; G01S 3/02
    See application file for complete search history.

(56) References Cited

U.S. PATENT DOCUMENTS

| | | | | |
|---|---|---|---|---|
| 8,558,714 | B1* | 10/2013 | Liff | G08B 13/2402 340/539.23 |
| 8,749,196 | B2* | 6/2014 | Cohen | A47L 9/2857 320/109 |
| 2013/0041560 | A1* | 2/2013 | Bongiorno | B60R 25/24 701/48 |
| 2013/0316738 | A1* | 11/2013 | Noonan | H04W 8/005 455/456.4 |
| 2016/0332535 | A1* | 11/2016 | Bradley | B60N 2/002 |

* cited by examiner

*Primary Examiner* — Erin File
(74) *Attorney, Agent, or Firm* — Hayes Soloway PC

(57) ABSTRACT

There is provided a safety method of detecting and signaling presence of a danger related to a danger source, the method comprising providing a base station at the danger source comprising first detectors and second detectors, the base station being adapted to determine an angular position of a target detected by a first detector among the first detectors within a detection zone based on an angular orientation of the first detector known a priori by the base station, and to determine a distance of the target by activating a second detector among the second detectors to measure the distance between the target and the base station in response to the target detection; and providing targets with portable target devices adapted to send signals in response to signals received from the first detectors of the base station. The first detectors are radio frequency transceivers and the second detectors are ultrasound transceiver. There is also provided a safety system for detecting and signaling presence of a target in danger zone.

18 Claims, 8 Drawing Sheets

SAFETY DETECTION SYSTEM AND METHOD

FIELD OF THE INVENTION

The present invention is related to the field of safety systems which may, for example, be used with industrial vehicles such as trucks. More particularly, the present invention is directed to a multi-zone safety system for sensing and responding to the existence of a potentially dangerous situation to reduce the occurrence of accidents in particular zones.

BACKGROUND OF THE INVENTION

Positioning is attracting considerable attention from both research and industry and is considered as a smart service provided to smart cities. Search and rescue, health-care applications and logistics are a few examples of applications which can benefit from having localization information.

Outdoor positioning is a traditional service provided by the Global Positioning System (GPS), which is a satellite based positioning System. The GPS does not perform well indoors because the signal is easily obstructed by most construction materials and hence making it useless for indoor positioning. For that raison, different technologies such as Radio Frequency Identification (RFID), UWB, Laser and Wi-Fi have been proposed to perform indoor localization.

Using a same system to localize an object or a person indoor and outdoor, without the need for extraneous infrastructure, is, however, not available.

Construction Site Safety:

Security, alarm system for construction workers:

On most construction sites, trucks and other vehicles move in and out on a regular basis for deliveries of materials, site preparation, pouring of concrete, removal of debris. Unfortunately, there are seldom any systems in place to manage all the traffic. As a result, the risk of injury in a construction site motor vehicle accident can be significant.

Furthermore, construction work is considered to be one of the most hazardous industrial activities. The rate of injury in the construction industry is higher than in other industries. The most frequent causes of death in the construction industry are falls from height, followed by fatal accidents with vehicles. According to the sources of The National UAE newspaper, 10 people in Abu Dhabi died on several construction sites in 2011.

In 2012, the number of accidents related to vehicles (trucks) having caused in France a permanent disability or death is respectively 2.7% and 14.5%. In the United Kingdom, about 7 workers die as a result of accidents involving vehicles or mobile plant on construction sites every year and about 93 are seriously injured.

From a global perspective, the Occupational Safety & Health Administration has mentioned that more than 800 construction workers die every year in the United States while working. For construction workers, being struck by vehicles or other objects consist the first cause of injuries and the second cause of death.

The number of accidental injury remains at a high level despite the technical progress made on equipment development and training provided to drivers of vehicles. Organizational decisions can help in preventing worker-vehicle collisions. However, these provisions are not sufficient to substantially reduce the risk and additional technical measures are needed to inform the driver of the presence of a person in a dangerous situation in the immediate vicinity of the vehicle Therefore, most of construction companies nowadays employ what is called a "Spotter". A spotter's main job is to prevent back-overs, swinging cranes, and many other well-known accidents from happening by guiding vehicles away from any hazardous spots.

The system helps in eliminating the need of spotters and to overcome the drawbacks of systems using cameras which have their limitations in case of operation in dusty or dark environments.

Hospital Environment Safety:

Healthcare, tracking system to avoid nosocomial transmission:

The second target application for this technology is the hospital environment and especially in the area of infection control. Indeed, nosocomial infections are a global problem. Health care-Associated or Hospital-Acquired Infections (HAIs) are infections patients acquire while already receiving medical or surgical treatment in a health care setting. Counted among the leading causes of preventable death in the United States, estimates suggest that at any given time, one in every twenty or twenty-five hospitalized patients has an HAI. Furthermore, Healthcare-associated infections (HAIs) in hospitals impose significant economic consequences on the healthcare system and cost $10 Billion a Year.

Recent estimates show that every year 648,000 American develop infections while in the hospital. More than 75,000 hospital patients may not be treatable with antibiotics and that prove fatal to them.

The main cause of nosocomial infections come from the hands of medical staff (50-70% of infections) and medical devices. Washing and hand disinfection are the most important prevention method to break the germ transmission chain.

SUMMARY OF THE INVENTION

As a first aspect of the invention, there is provided a safety detection system for detecting and signaling a target in a danger zone, the safety detection system comprising:
  a base station adapted to be positioned at a danger source and comprising:
    a plurality of detectors adapted to cover a plurality of adjacent and mutually exclusive zones forming a single intersection point coinciding with the base station such that each detector has an angular orientation and is adapted to cover an associated single zone only; and
    a control device adapted to signal presence of a detected target within a zone by a detector comprising a position of the detected target with respect to the base station, the control device comprising a memory storing data mapping the detectors to their respective angular orientations, where the mapping data is used by the control device to determine an angular orientation of the detector associated with the detected target as an indication of an angular position of the detected target with respect to the base station.

Preferably, each detector comprises a directional radio frequency (RF) transceiver and an associated ultrasound (US) transceiver, the RF transceiver being adapted to detect presence of a target within an associated zone and the US transceiver being adapted for determining a distance between the detected target and the base station and reporting said distance to the control device, the position of the detected target with respect to the base station comprising the angular position and the distance.

Preferably, the US transceiver is adapted to be activated in response to said target detection by the RF transceiver.

Preferably, the control device is adapted to be connected to the plurality of detectors for determining the detector associated with the detected target, the detector determining process comprising:
  receiving response signals having respective signal strengths received at said plurality of detectors from the detected target in response to detection signals transmitted by said plurality of detectors;
  determining a strongest response signal among said received response signals; and
  determining the detector as the one having received said strongest signal among said plurality of detectors.

Preferably, the plurality of zones are in the form of circular segments or triangles respectively having the intersection point as a center point of the segments or as a single intersection point of the triangles.

Preferably, the target is a person having a portable target device comprising a RF transceiver transmitting the response signals in response to the detection signals received from the detectors.

The danger source can be a movable object.

Preferably, the control device further comprises a direction unit comprising a sensor adapted to detect a movement direction of the movable object, wherein said control device is adapted to determine whether the zone associated with detected target represents a danger zone based on the movement direction of the object, and to identify said detected target as a high risk target or a low risk target based on said danger zone determination.

Preferably, the control device is adapted to transmit a danger signal to the target using the directional RF transceiver associated to the zone in which the target is detected, and wherein the portable target device further comprises a an indicator adapted to signal presence of a danger in response to the danger signal received from the base station RF transceiver.

Preferably, the movable object is a vehicle and the target is a person, and wherein the base station is adapted to be mounted at said vehicle and the portable target device is adapted to be portable by said person.

Preferably, the control device is further adapted to be connected to an ignition system of the vehicle for controlling the ignition system based on the position of the detected target, said controlling comprising deactivating the vehicle.

The danger source can be a contaminated patient, the target is a person, and in this case the base station is adapted to be mounted at a fixture in proximity of the patient and the portable target device is adapted to be portable by said person.

Preferably, the control device further comprises a display for providing a visual representation of detected targets on said display with their respective positions determined by the control device.

Preferably, the detection system further comprises portable target devices adapted to be detected by the detectors of the base station when the devices are located within the zones.

Preferably, the portable target devices are adapted to be portable by targets and wherein each one of the portable target devices comprises an indicator comprising a sensor adapted to change an output state in response to a danger signal received from the base station and to generate an alarm signal in response to the danger signal comprising a sound, a smell, a light, a change of color, an electrical choc or a vibration.

Preferably, each one of the base station detectors comprise a base station RF transceiver and wherein each one of the portable target devices comprises a target RF transceiver adapted to send a response signal in response to a signal received from the base station RF transceiver, the response signal being detectable by the base station RF transceiver and is indicative of presence of a target.

The danger source can be an industrial vehicle in a construction field and the targets are construction workers.

The danger source can be a contaminated patient in a medical center and the targets are medical staff.

As a further aspect of the invention, there is provided a safety method of detecting and signaling presence of a danger related to a danger source, the method comprising:
  providing a base station at the danger source comprising first detectors and second detectors, the base station being adapted to determine an angular position of a target detected by a first detector among the first detectors within a detection zone based on an angular orientation of the first detector known a priori by the base station, and to determine a distance of the target by activating a second detector among the second detectors to measure the distance between the target and the base station in response to the target detection;
  providing targets with portable target devices adapted to send signals in response to signals received from the first detectors of the base station;

Preferably, the first detectors are RF transceivers and the second detectors are ultrasound transceivers.

DETAILED DESCRIPTION OF THE INVENTION

Figure 1:
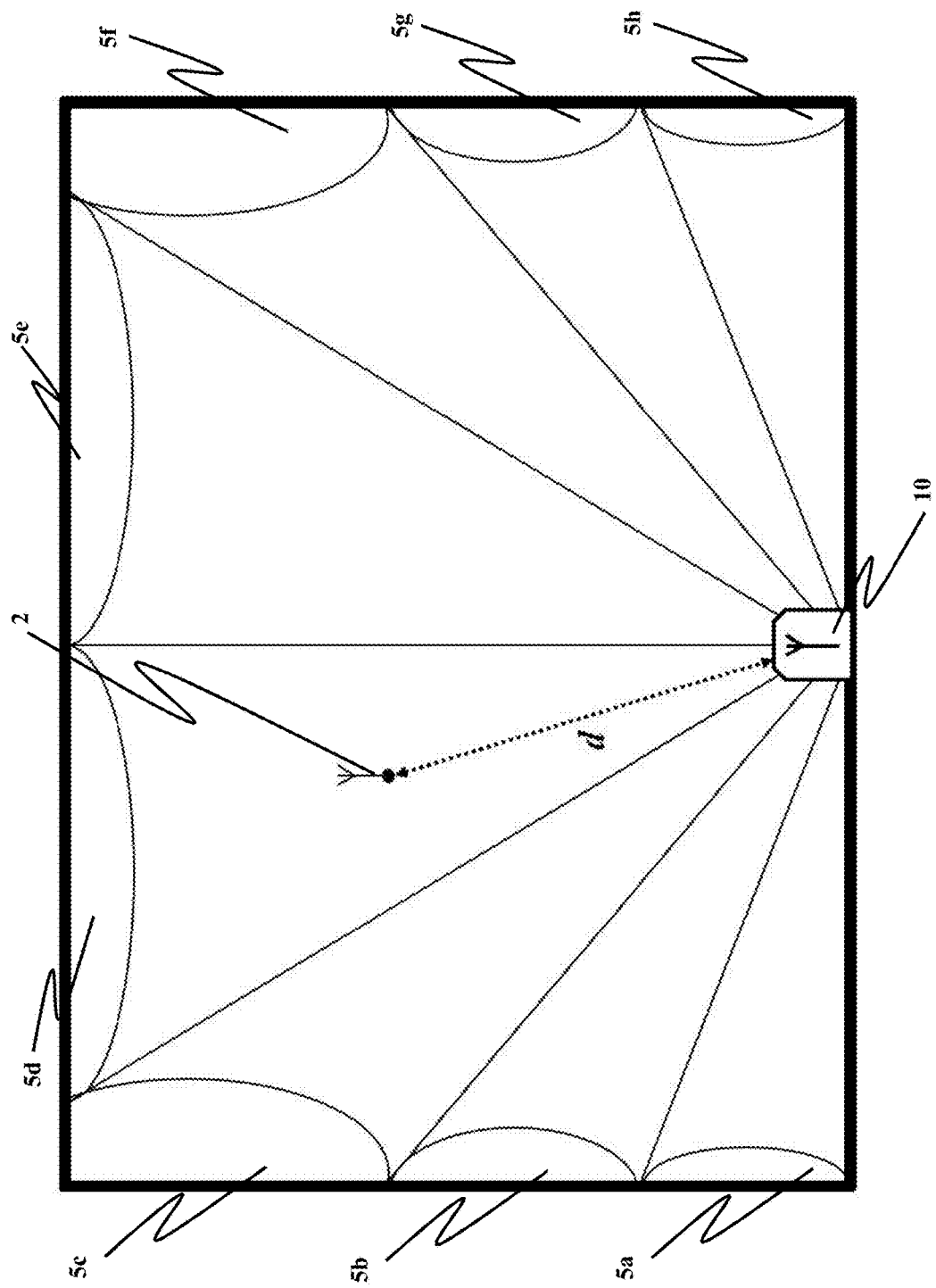
FIG. 1 illustrates multiple detection zones with respect to the position of a base station in accordance with an embodiment of the present invention.

The proposed safety detection system is a smart indoor/outdoor real time locating system. It has many features that are quite beneficial for users whether being as companies, or individuals. One major point would be that it is a standalone system, making it suitable for both indoor and outdoor localization schemes. Most outdoor localization systems employ Global Positioning Systems (GPS) for target detection. In a construction surrounding, for example, the GPS doesn't perform well indoors because the signal is easily obstructed by most construction materials and hence making it useless for indoor positioning. Not relying on GPS or other common indoor localization techniques would have a major effect on the system's overall performance, particularly power wise. It would also eliminate the need of adding any infrastructure, which is one of the aspects of the invention. Having such a system is quite promising as it will eliminate the need for Wi-Fi connectivity as well as being convenient for harsh environments.

Therefore, in one aspect, referring to FIGS. 1-9, the invention proposes a new system employing a base station 10 and portable target devices 2 adapted to be used for indoor or outdoor localization using sensing and real time communication systems. The present invention is be applied in a variety of applications involving internal or external monitoring and positioning of objects or people (targets) 2. To localize an object or a person indoor or outdoor, in a preferred embodiment of the invention, the proposed system and method employ two technologies (Radio Frequency and Ultrasound) in a manner different from the conventional approaches.

In an embodiment of the invention, the present invention is adapted to determine the position of a target 2 in a different way compared to the traditional positioning (x, y) methods such as triangulation. In an embodiment of the invention, the proposed system and method provide localization information directly in a polar form comprising an angular position (or an equivalent geographical zone identifier) in which the target 2 is located and the distance between the target 2 and the base station 10.

In an embodiment of the invention, the targets 2 are provided with portable target devices 4 comprising radio frequency transceivers 6, such as RF or RFID tags, adapted to receive and respond to a RF signal received from a base station 10, and the coverage area is divided in multiple zones 5 each of which is associated with a base station radio frequency transceiver 14 and a base station ultrasound transceiver 16 such that each zone is defined by an independent radio coverage as well as an independent ultrasound coverage. The base station RF transceivers 14 and ultrasound transceivers 16 are mounted at or in proximity of the base station 10 which defines the reference point (danger source).

In an embodiment of the invention, the targets 2, equipped with the portable target devices 4 comprising the RF tags 6, respond to radio frequency signals emitted by the RF transmitters 14 at the base station 10. A response signal emitted by the portable target device 4 is indicative of the presence of the target 2. Once a target 2 has been detected in a given zone 5, the base station ultrasound transceiver 16 associated with that given zone 5 is activated to determine the distance between the base station 10 and the target 2 detected using the ultrasound transceiver 16.

The position of the detected target 2 combines both an angular position of the target 2 with respect to the base station 10 (or an identification of the zone 5 in which the target 2 has been detected) and the distance between the target 2 and the base station 10. The detection zones 5 are configured such that a direct relationship is established between the angular position of the target 2 with respect to the base station 10 and the exact zone in which the target 2 has been detected. In an embodiment of the invention, the RF technology used is the 868 MHz industrial, scientific, and medical (ISM) radio band, and the ultrasound technology used is the one used in the automotive field.

As illustrated in FIG. 1, in an embodiment of the invention, the zones 5 (also called detection zones) are configured such that the base station 10 coincides with the single intersection point of multiple adjacent and mutually exclusive detection zones 5. The example given in FIG. 1 is illustrated to eight detection zones 5a, 5b, 5c, 5d, 5e, 5f, 5g, 5h (referred to any one of them individually, to a part or all of them collectively with the reference number 5). All the detection zones 5 are mutually exclusive and share the base station 10 as a unique intersection point between them. The detection zones 5 can for example be adjacent and mutually exclusive triangles sharing a same intersection point at the location of the base station 10, or alternatively, adjacent and mutually exclusive circular segments sharing a same center point at the location of the base station 10. When a target 2 is detected within a given zone 5, an identification of the zone 5 in which the target 2 is detected enable the determination of the angular position of the target 2 with respect to the base station 10.

The positioning accuracy can be enhanced by increasing the number of detection zones 5. The increase of the number of zones 5 implies increasing the number detectors 12 comprising the RF transceivers 14 and ultrasound transceivers at the base station side 16. This is as each zone must be associated with at least one RF transceiver 14 and at least one ultrasound transceiver 16 for each detection zone 5 respectively. The base station RF transceivers 14 are adapted to detect the targets 2 with the detection zones 5, and the base station ultrasound transceivers 16 are adapted to determine the distances between the base station 10 and the targets 2 detected within said zones 5.

Though the description provided herein is provided using a single base station RF transceiver 14 and to a single base station ultrasound transceiver 16 for each detection zone 5, it should be understood that, at the base station level, more than one RF transceiver 14 and more than one ultrasound transceiver 16 can be associated with a single zone 5, however more than one zone 5 cannot be associated with a same RF transceiver 14 and a same ultrasound transceiver 16 as this would create a confusion while determining the position of a target 2. For cost and complexity reduction, in an embodiment of the invention, a single RF transceiver and a single ultrasound transceiver are associated to each zone.

Figure 2:
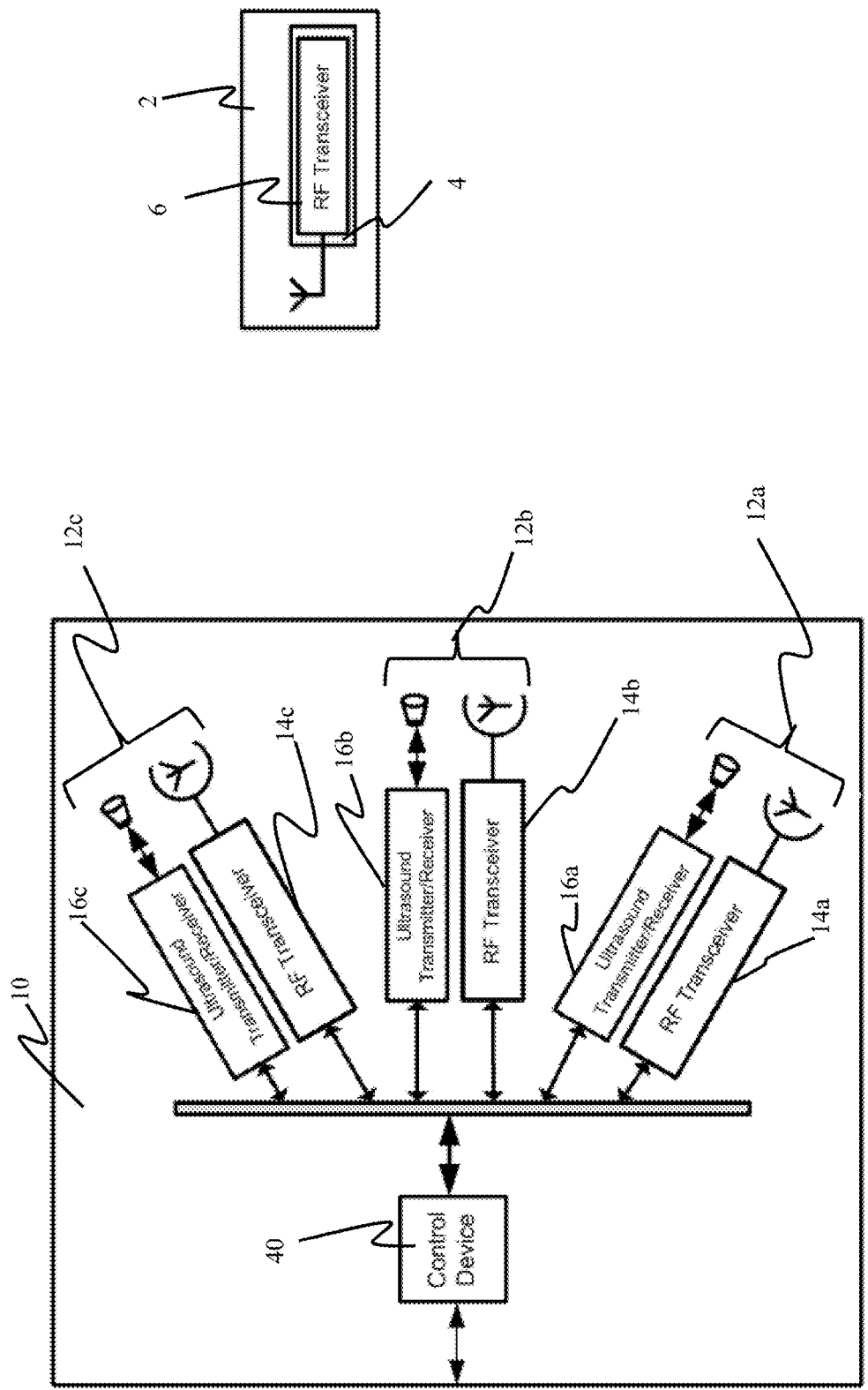
FIG. 2 illustrates a base station comprising three detectors and a control device as well as a target portable device in accordance with an embodiment of the present invention.
Figure 3:
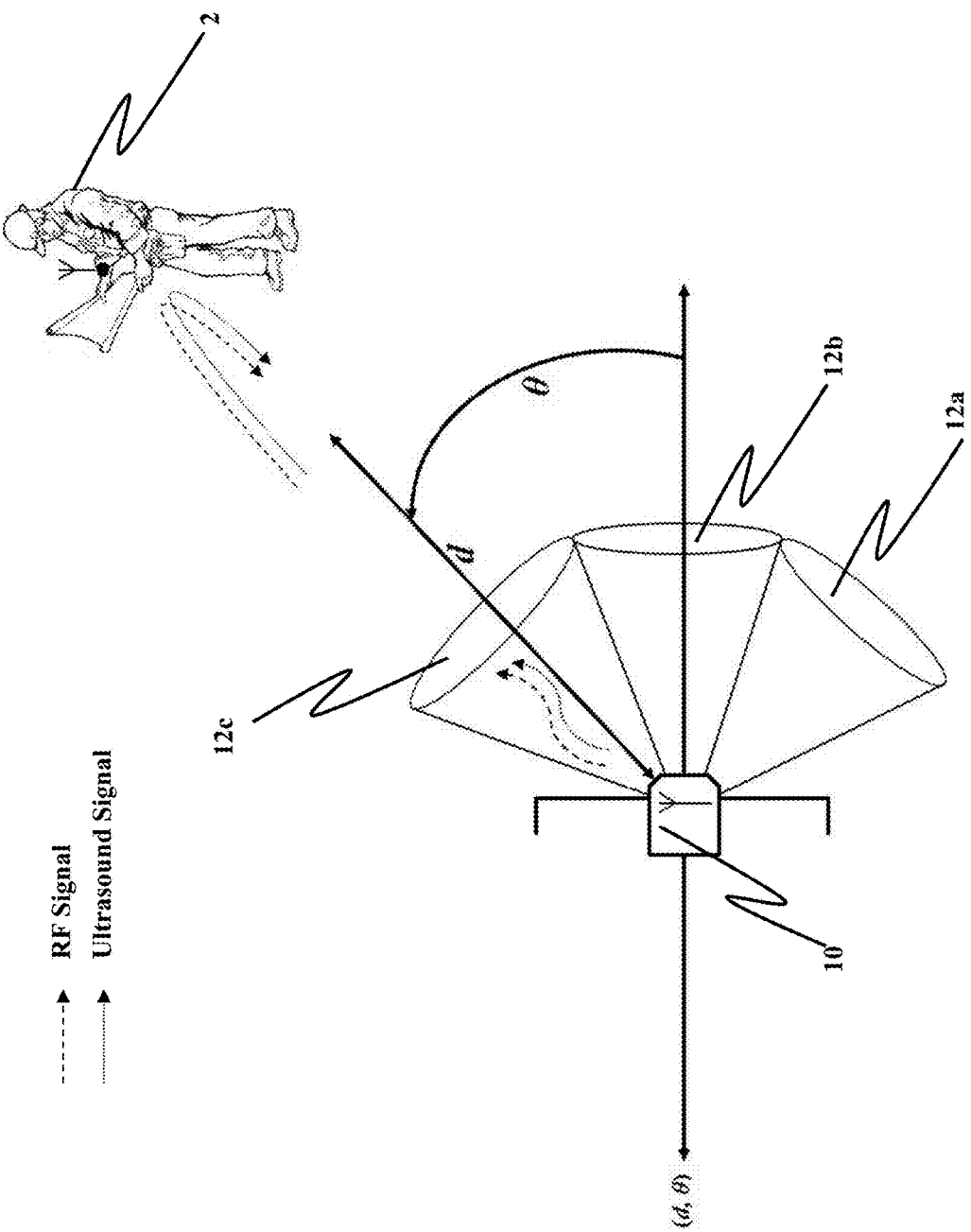
FIG. 3 illustrates a detection system measuring the angular position and distance of a construction worker with respect to the base station in accordance with an embodiment of the present invention.

As illustrated in FIG. 2 and FIG. 3, the base station 10 comprises detectors 12 comprising RF transceivers 14 and ultrasound transceivers 16 mounted in pairs such that for each detection zone 5, there is associated a detector 12 comprising a RF transceiver 14 and an ultrasound transceiver 16 adapted to provide signal coverage to the same detection zone 5 to which they are both associated. The RF transceiver 14 comprises a RF transmitter and a RF receiver. In an embodiment of the invention, the RF transceiver 14 and an ultrasound transceiver 16 have a same angular orientation (pointing in the same direction). In an embodiment of the invention the RF transceiver 14 does not have the same angular orientation as the ultrasound transceiver 16 however has a directional antenna associated with each transceiver 14 adapted to cover a specific zone which is the same zone covered by the ultrasound transceiver 16. The ultrasound transceiver 16 comprises an ultrasound transmitter and an ultrasound receiver which can be separate devices or combined in a single device. The system illustrated in FIG. 2 is provided as an example only and comprises three detectors 12a, 12b, 12c with three RF transceivers 14a, 14b, 14c and 3 associated ultrasound (US) transceivers 16a,16b, 16c, each pair of RF transceiver 14 and associated US transceiver 16 covering a 60 degrees detection zone 5 such that the first pair of RF/US transceivers 14a,16a covers the 0°-60° zone, the second pair of RF/US transceivers 14b, 16b covers the 60°-120° zone, and the third pair of RF/US transceivers 14c, 16c covers the 120°-180° zone. The three detectors 12a,12b,12c comprising the three pairs of transceivers are oriented about 30°, 90° and 120° such that each pair of transceivers 14,16 is oriented according to a midline cutting the detection zone 5 in two symmetric areas. In case only two zones are defined, the associated two pairs of RF/US transceivers 14, 16 would preferably be positioned at 45° and 135° respectively. In case six zones are defined, the associated six pairs of RF/US 14,16 transceivers would preferably be positioned at 15°, 45°, 75°, 105°, 135° and 165°.

Figure 5:
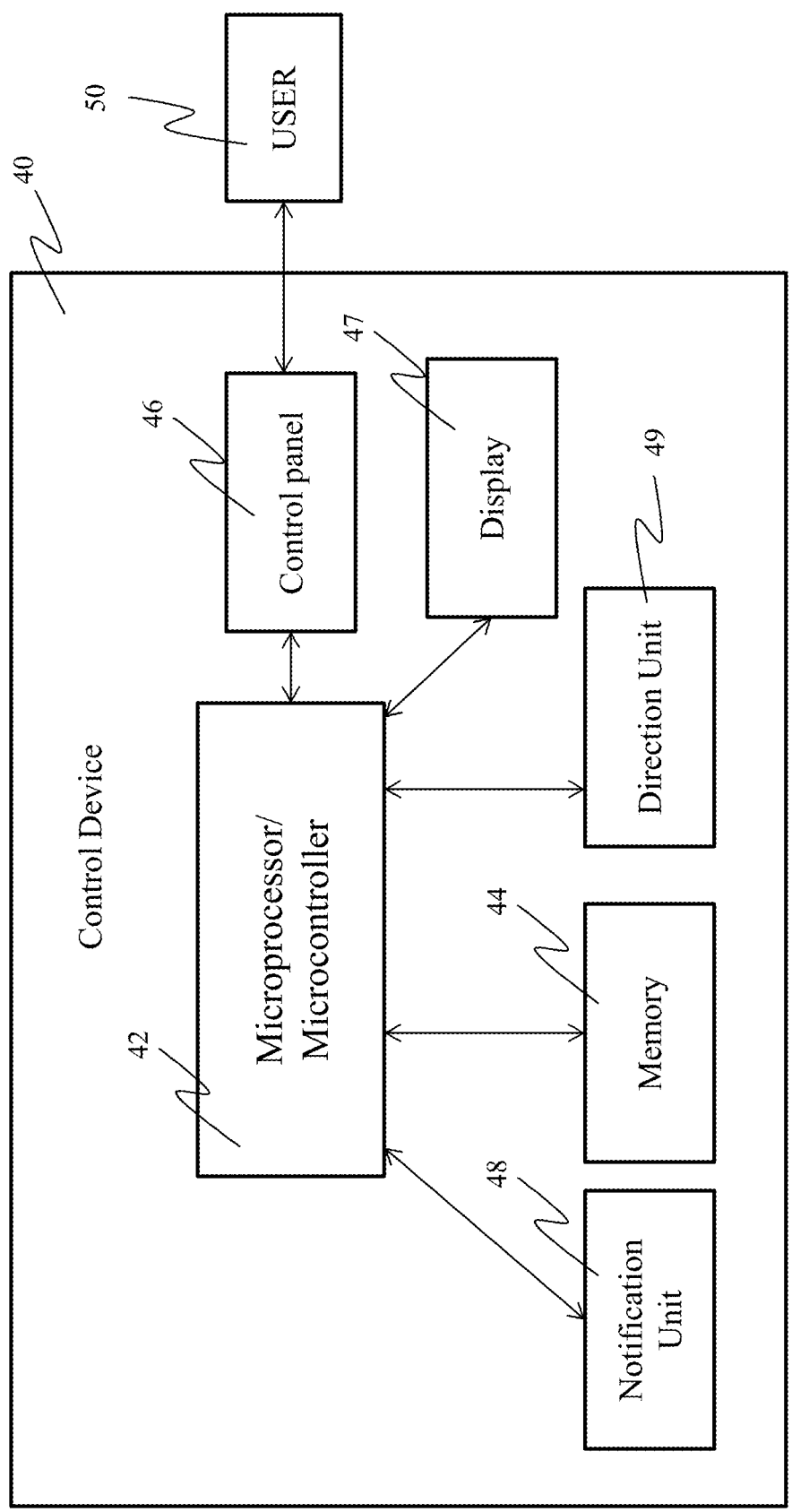
FIG. 5 illustrates a control device part of the base station in accordance with an embodiment of the present invention.

In an embodiment of the invention, the base station comprises a control device 40 adapted to be connected to the base station RF transceivers 14 and the ultrasound transceivers 16. The control device 40 is adapted to control the operation of the base station RF and ultrasound transceivers 14 and 16. In an embodiment of the invention, as illustrated in FIG. 5, the control device 40 comprises a microprocessor or microcontroller 42.

In an embodiment of the invention, the control device 40 is to be adapted to analyze response signals received from a portable RF transceiver 6 (at a portable target device 4) in response to a RF signal transmitted by one or more RF transceivers 14 at the base station 10. The analysis comprise determining the strongest response signal among these based on the power of these received response signals. This identification of the strongest received signal allows for the determination of the zone 5 in which the target 2 is located. The target zone 5 is determined by identifying the base station RF transceiver 14 having received the strongest response signal and by determining the zone 5 to which said base station RF transceiver 14 is associated.

The rationale behind this analysis is that each response signal transmitted by a portable RF transceiver 6 at a portable target device 4 can in fact be detected by multiple RF transceivers 14 at the base station 10. These response signals will however have different signal power strengths with the strongest signal being received by the base station transceiver 14 located at the closest distance with the target 2. By determining the strongest signal and the base station RF transceiver 14 having detected said strongest signal, the zone 5 associated to said target 2 can be determined based on the relationship defined between the multiple zones 5 and the multiple RF/US transceivers 14/16.

The relationship information mapping the base station RF/US transceivers 14/16 to the different zones 5 is accessible to the control device 40. Preferably, as illustrated in FIG. 5, the control device 40 comprises a memory 44 storing a data database mapping the base station RF transceivers 14 to their associated US transceivers 16 and to their associated zones 5.

In an embodiment of the invention, the control device 40 is adapted to receive the different RF response signals emitted by the portable RF transceivers 6 (at the portable target device 4) and captured by the different RF receivers 14 in connection with a same target 2, to compare the received response signals for determining the strongest signal among them, and to determine the base station RF transceiver 14 associated with the strongest signal received. Based on the base station RF transceiver 14 determined as being associated with the strongest response signal received, the control device 40 is adapted to activate the base station ultrasound transceiver 16 associated with the base station RF transceiver 14 identified with the strongest signal for determining the distance between the target 2 and the base station 10.

In an embodiment of the invention, the control device 40 is adapted to inquire a first database inside the memory 44 for determining the ultrasound transceiver 16 associated with the RF receiver 14 identified with the strongest RF signal. In fact, when the RF transmitters transmit signals in their respective zones 5, the targets 2 located in these zones respond to these signals by transmitting response signals which are captured by the RF receivers at the base station 10. Each response signal transmitted by a given target 2 may in fact be received by one or more RF receivers. It is however important to be able to identify the exact zone 5 in which that given target 2 is located and the way to determine this information is by identifying the RF receiver having receiving the strongest response signal.

By identifying the RF receiver with the strongest received response signal, it is possible to determine detection zone in which the target is located by inquiring a second database storing data mapping each RF transceiver 14 to an associated detection zone identifier 5. This is as each detection zone 5 is associated/mapped to a given RF transceiver 14 and this mapping information is stored in the second database. In an embodiment of the invention, the first and second databases consist of the same database.

In an embodiment of the invention, in order to maximize efficiency and reduce power consumption, an ultrasound transceiver 16 is activated only when a target 2 is detected within the detection zone 5 to which it is associated.

In an embodiment of the invention, as illustrated in FIG. 5, the control device 40 comprises a control panel 46 for enabling a user 50 to control one or more functionalities of the control device 40. In an embodiment of the invention, the base station RF transceivers 14 are adapted to be activated manually by an operator 50 using the control panel 46 or automatically as a function of predefined instructions stored inside the memory 40 and adapted to be accessible the microprocessor/microcontroller 42 of the control device 40.

In an embodiment of the invention, as illustrated in FIG. 5, the control device 40 comprises a display device 48 adapted to display in a visual format the position of detected targets 2 with respect to the base station 10 location (coinciding with the danger source location).

In an embodiment of the invention, the portable target devices 4 provided to the targets 2 comprise RF tags comprising the RF transceivers 6 adapted to respond to RF signals received from the base station 10. In another embodiment of the invention, the portable target devices 4 comprise RFID tags storing RF identifiers allowing for the identification of targets 2 to which they relate. In such a case, the base station RF transceivers 14 comprise RFID readers, and the control device 40 is adapted to be connected to a RFID database mapping the RFID identifiers to target identification information such as the name and address of the targets in case the targets are persons. Preferably, the RFID database is stored inside the memory 44 of the control device 40.

In an embodiment of the invention, the base station 10 is adapted to be positioned at a danger source such that the multiple zones 5 are defined with respect to the danger source with respect to which the target positions are determined. The danger source can be a movable or an immovable object.

Figure 4:
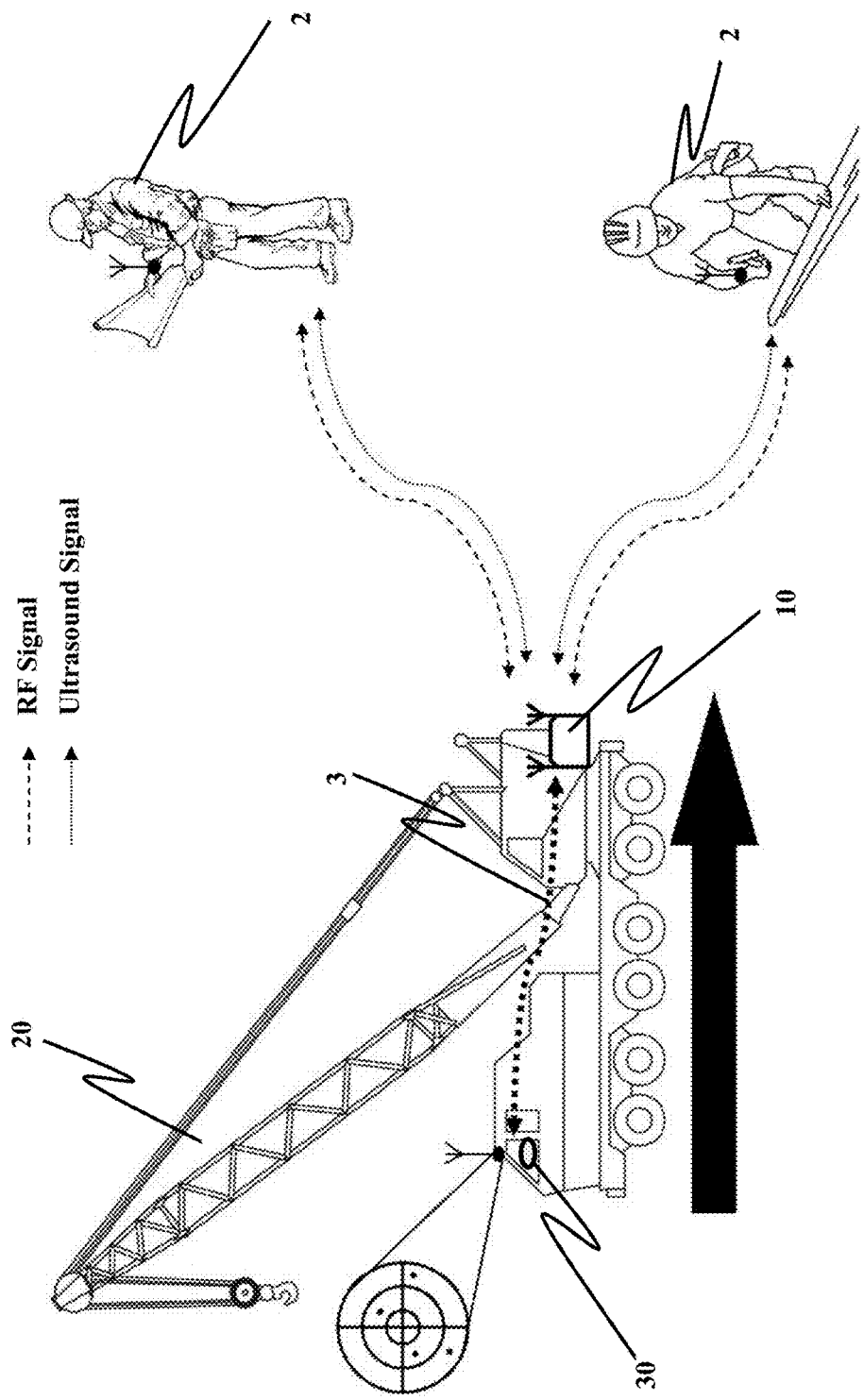
FIG. 4 illustrates a base station mounted to an industrial truck in a construction field where the targets are construction workers provided with portable target devices in accordance with an embodiment of the present invention.

In an embodiment of the invention, as illustrated in FIG. 4, the danger source is a vehicle 20, and the base station 10 is adapted to be mounted at the vehicle 20. Preferably, the multiple detection zones 5 comprise hidden and/or dead angle zones with respect to an operator 30 of the vehicle 20. The vehicle 20 can for example be an industrial truck operating in a construction field in which the multiple zones 5 are defined, and the targets 2 can for example be construction workers exposed to collision accidents by the industrial truck.

Preferably, the base station 10 comprises a mounting structure adapted to mount the base station 10 to said vehicle 20. Preferably, the base station 10 is adapted to be coupled to a back side component of the vehicle 20 through the mounting structure. Preferably, the control panel 46 comprising a display 47 is adapted to be mounted inside the vehicle 20 in such a manner to be accessible to the vehicle operator 30 such as the driver.

Figure 6:
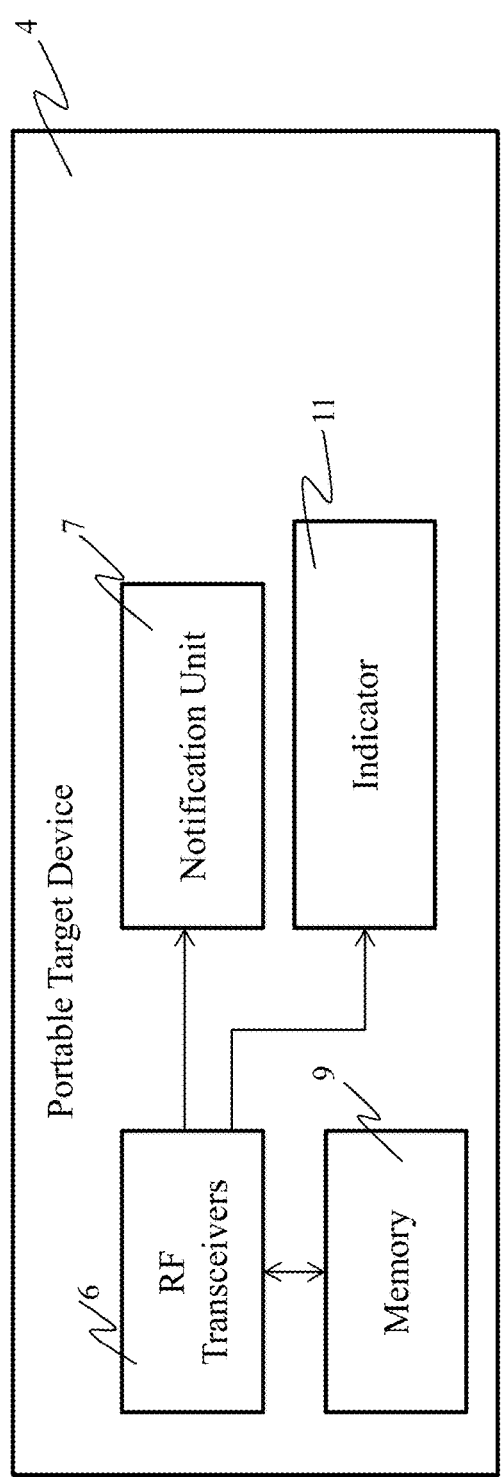
FIG. 6 illustrates a portable target device in accordance with an embodiment of the present invention.

In an embodiment of the invention, the portable target devices 4 consist of RF tags or RFID tags. In another embodiment of the invention, as illustrated in FIG. 6, there is provided the portable target devices 4 adapted to be positioned at the targets 2 comprising the portable RF transceivers 6, the portable target devices 4 further comprising a notification unit 7 in communication with the RF transceivers 6 adapted to transmit notification signals in response to the RF signals received from the base station 10. The notification signals can also be a sound signal, a smell, a light or a vibration. In an embodiment of the invention, the notification unit 7 comprise vibrators adapted to vibrate for notifying the targets 2 of the presence of a danger source. The portable target devices 4 are preferably adapted to be embedded in tools portable by the targets such as a watch, a helmet and a communication device.

In an embodiment of the invention, the control device 40 is adapted to be connected to an ignition system associated with the danger source, such as to the ignition system of the vehicle 20, for deactivating the vehicle 20 at the detection of a target 2 within a danger zone. In an embodiment of the invention, the control device 40 is adapted to determine a danger zone based on predefined conditions such as the proximity distance between the danger source (such as the vehicle 20) and the target 2.

In an embodiment of the invention, as illustrated in FIG. 5, the control device 40 comprises a notification unit 48 adapted to issue an alarm signal, such as a sound, a smell, a light or a vibration, at the detection of a target within the danger zone.

In an embodiment of the invention, the base station 10 comprises a direction unit, as a part of the control device 40 or independently, comprising a direction sensor adapted to determine the movement direction of the vehicle 20 with respect to the multiple detection zones 5. In an embodiment of the invention, the direction unit 49 is adapted to determine the zone 5 within which the vehicle 20 is moving or the zone to which the vehicle 20 is heading. In fact, the proximity distance is not always indicative of the level of danger as the target 2 can be located close to the vehicle 20 where the vehicle 20 is moving in a direction opposite the position of the target 2.

In an embodiment of the invention, the direction unit 49 is adapted to be connected to the control device 40 which is adapted to receive the movement direction of the vehicle 20 or the zone in which the vehicle 20 is moving or to which the vehicle 20 is heading and to issue an alarm signal, through the notification unit 48, only in case where the vehicle 20 is moving in a zone or in a direction heading to the same zone 5 where a target 2 has been detected.

In an embodiment of the invention, the control device 40 is adapted to first receive the movement direction of the vehicle 20 or the zone in which the vehicle 20 is moving or to which the vehicle 20 is heading (the danger zone), and then to activate only the RF transceiver 14 associated with said danger zone for determining presence of a target 2 within said danger zone. If a target 2 is detected in said danger zone, then the associated ultrasound transceiver 16 is activated to determine the distance between the vehicle (taken from the base station 10 coupled thereto) and the target 2.

In an embodiment of the invention, all the RF transceivers 14 at the base station 10 are activated at a regular time intervals such that omnidirectional RF signals are transmitted to scan the multiple zones simultaneously.

In an embodiment of the invention, all the targets 2 detected within the multiple zones 5 are reported to the control device 40 and displayed on the display 47. In an embodiment of the invention, the detected targets 2 are divided in high risk targets and low risk targets and identified accordingly to the vehicle operator 30. In an embodiment of the invention, the high risk targets are those present in the danger zones determined by the control device 40.

In an embodiment of the invention, the control device 40 is adapted to activate the RF transceivers 14 to transmit different types of signals, comprising high risk signals (signals indicative of a high risk) and low risk signals (signals indicative of low risk). In an embodiment of the invention, a high risk signal consist of a given number of consecutive signals transmitted within a given time frame (for example three signals within five seconds time frame). This given number can be predefined and known to the portable target devices 4 of the targets 2.

In an embodiment of the invention, the portable target devices 2 are adapted to discriminate between a high risk signal and a low risk signal. In an embodiment of the invention, a notification unit 7 at a portable target device 4 is adapted to issue an alarm signal only at the receipt of a high risk signal from the base station. In another embodiment of the invention, the notification unit 7 is adapted to issue a high risk alarm signal and a low risk alarm signal based on the type of signal received from the base station 10. For example, a high risk alarm signal can be a sound signal having a certain degree of sound intensity higher than an intensity associated to a low risk alarm signal.

Figure 7:
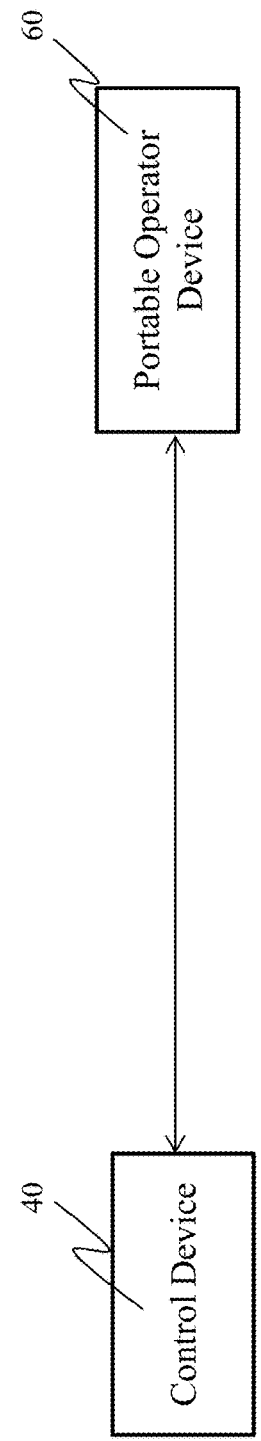
FIG. 7 illustrates a portable operator device in communication with a control device in accordance with an embodiment of the present invention.

In an embodiment of the invention, as illustrated in FIG. 7, the vehicle operator 30 is provided with a portable operator device 60 adapted to be in communication with the control device 40 of the base station for signaling an accident risk to the operator through an alarm signal such as a sound, a smell, a light or vibration alarm signal. In an embodiment of the invention, the communication between the control device 40 and the portable operator device 60 is any type of wired or wireless communication 3 such as Bluetooth, satellite communication or Wi-Fi. In an embodiment of the invention, the portable operator device 60 is adapted to be embedded in a tool portable by the vehicle operator such as a watch, a helmet, a communication device or another wearable object. In an embodiment of the invention, the portable operator device 60 is a mobile device running a mobile application configured to be in communication with the control device 40 as provided herein.

Figure 8:
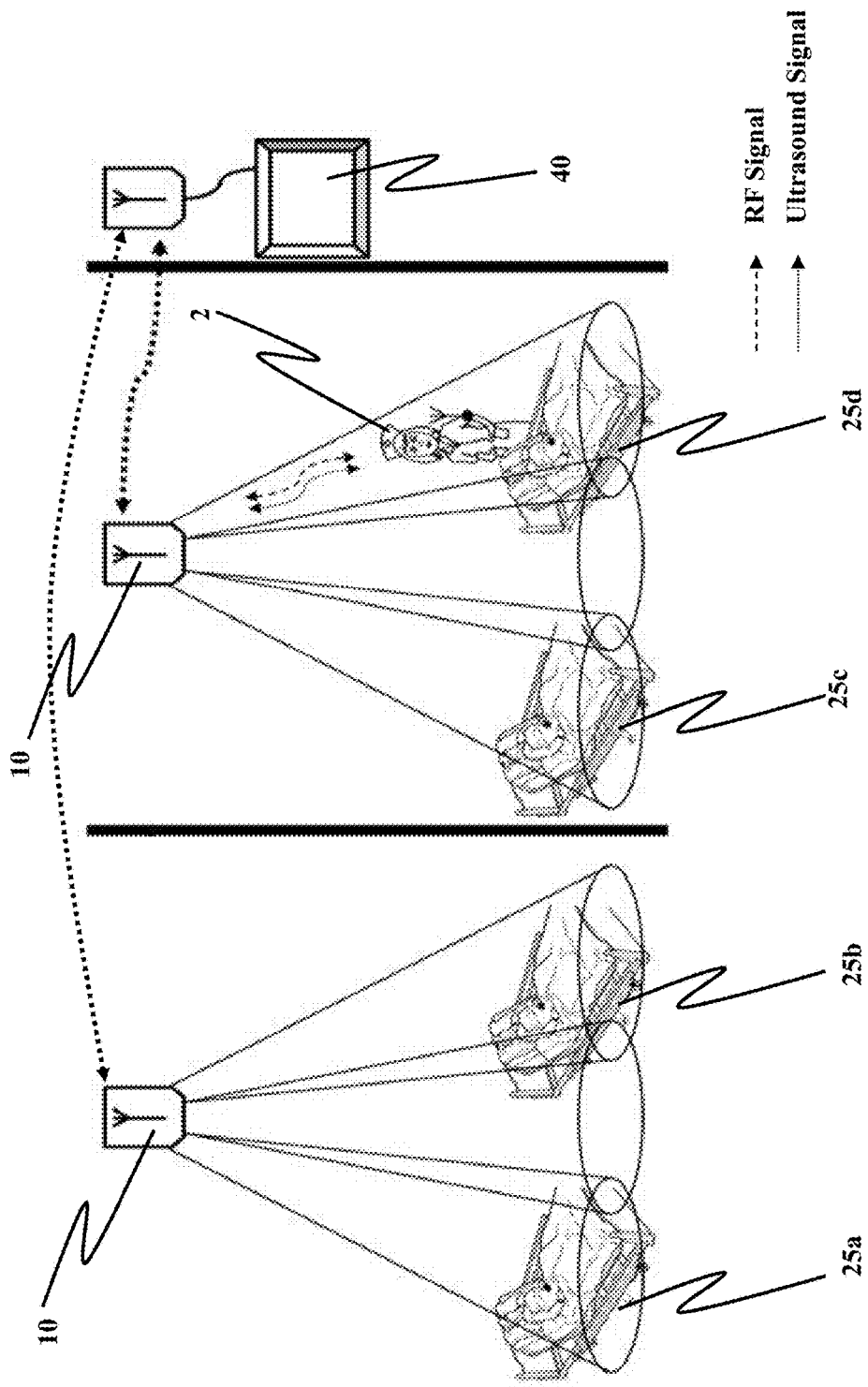
FIG. 8 illustrates a detection system comprising two base stations mounted in contaminated patients rooms for signalling presence of a contaminated person to medical staff targets in accordance with an embodiment of the present invention.

In an embodiment of the invention, as illustrated in FIG. 8, the danger source is a contaminated patient 25 and the base station (BS) 10 is mounted in proximity of said contaminated patient 25. In an embodiment of the invention, the base station (BS) 10 is mounted to an object where the contaminated patient 25 is located such as a room wall, bed or any other fixture, immovable or movable, such that the RF transceivers 14 and ultrasound transceivers 16 are oriented towards a pathway leading to the contaminated patient 25.

In an embodiment of the invention, the targets 2 are medical staff and/or visitors or other persons accessible to the contaminated patient, and the portable target devices 4 are provided to be ported by said targets 2. In an embodiment of the invention, the control device 40 is provided for monitoring contamination risks of the targets by the patient.

In an embodiment of the invention, the danger source is a patient 25 for monitoring from sources of contamination, and the targets 2 are sources of contamination including but not limited to medical staff and/or visitors and/or other persons accessible to the patient who are already contaminated or having risk of contamination, and the portable target devices 4 are provided to be ported by said targets 2. In an embodiment of the invention, the control device 40 is provided for monitoring contamination risks of the patient by the targets.

In an embodiment of the invention, the memory 44 of the control device is adapted to store information associated with the RF signals received from the portable target devices 4 such as an indication of whether or not an RF response signal has been captured by the base station 10, the strength of the RF response signals received, and/or the number of RF signals which may be indicative of a potential risk of contamination.

In an embodiment of the invention, as illustrated in FIG. 6, the portable target devices 4 comprise a memory 9 adapted to store information associated with the RF signals received from the base station 10 such as an indication of whether or not an RF signal has been captured by the portable target device 4, the strength of the RF signal received, and/or the number of RF signals which may be indicative of a potential risk of contamination.

Figure 9:
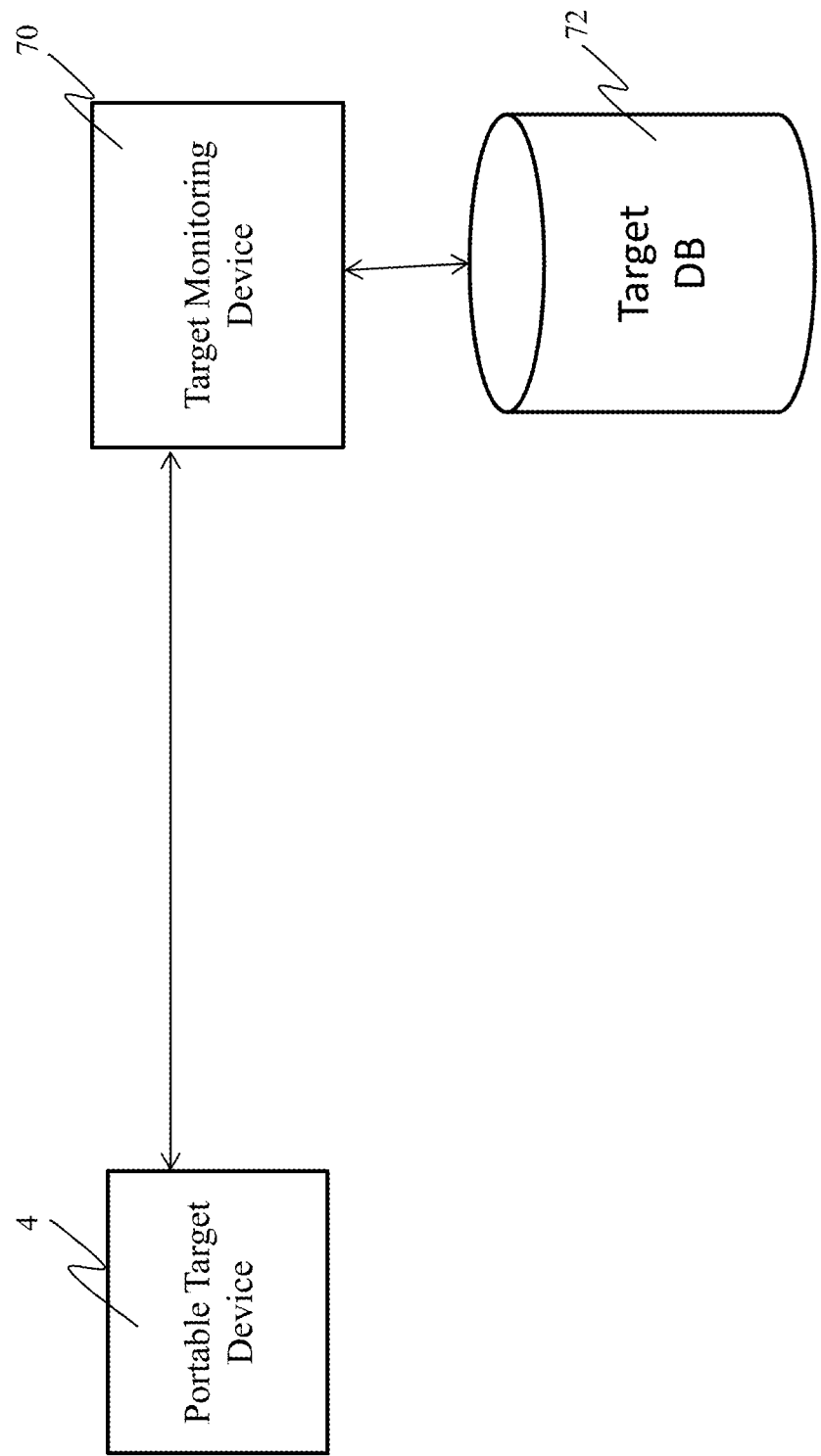
FIG. 9 illustrates a target monitoring device in communication with portable target devices and a target database in accordance with an embodiment of the present invention.

In an embodiment of the invention, as illustrated in FIG. 9, the portable target devices 4 are adapted to be connected to a target monitoring device 70 adapted to receive the information from the portable target devices 4 and to analyze said information for determining contamination risks of the targets 2 by the patient 25 (or contamination risks of the patient 25 by the targets 2 depending on the application). In an embodiment of the invention, the target monitoring device 70 is adapted to be connected to a database 72 mapping identifiers associated with the portable target devices to identification information allowing to identify the persons porting these portable target devices 4.

In an embodiment of the invention, as illustrated in FIG. 6, the portable target devices 4 comprise an indicator 11 allowing to signal a contamination risk of the target. In an embodiment of the invention, the indicator 11 comprises a sensor adapted to change an output state of said sensor, such as RF impedance, at the detection of a RF signal and to issue a signal such as a sound, a light, a smell, a color change or a vibration at the detection of a RF signal. In an embodiment of the invention, the indicator 11 comprises a led connected to the sensor for activating the led at the change of the sensor output state which could be indicative a contamination risk of the target 2 (or contamination risk of the patient 25 by the target 2 depending on the application).

In an embodiment of the invention, the monitoring device 70 comprises one or more features of the control device 40 as disclosed in the various embodiments of the present invention.

The invention claimed is:

1. A safety detection system for detecting and signaling a target in a danger zone, the detection system comprising:
    a base station adapted to be positioned at a danger source and comprising:
        a plurality of detectors adapted to cover a plurality of adjacent and mutually exclusive zones forming a single intersection point coinciding with the base station such that each detector has an angular orientation and is adapted to cover an associated single zone only; and
        a control device adapted to signal presence of a detected target within a zone by a detector comprising a position of the detected target with respect to the base station, the control device comprising a memory storing data mapping the detectors to their respective angular orientations, where the mapping data is used by the control device to determine an angular orientation of the detector associated with the detected target as an indication of an angular position of the detected target with respect to the base station,
    wherein each detector comprises a directional radio frequency (RF) transceiver and an associated ultrasound (US) transceiver, the RF transceiver being adapted to detect the presence of a target within an associated zone and the US transceiver being adapted for determining a distance between the detected target and the base station and reporting said distance to the control device, the position of the detected target with respect to the base station comprising the angular position and the distance, and
    wherein said US transceiver is adapted to be activated in response to said target detection by the RF transceiver.

2. The safety detection system of claim 1, wherein the control device is adapted to be connected to the plurality of detectors for determining the detector associated with the detected target, the detector determining process comprising:
    receiving response signals having respective signal strengths received at said plurality of detectors from the detected target in response to detection signals transmitted by said plurality of detectors;
    determining a strongest response signal among said received response signals; and
    determining the detector as the one having received said strongest signal among said plurality of detectors.

3. The safety detection system of claim 1, wherein the plurality of zones are in the form of circular segments or triangles respectively having the intersection point as a center point of the segments or as a single intersection point of the triangles.

4. The safety detection system of claim 1, wherein said target is a person having a portable target device comprising a target RF transceiver transmitting the response signals in response to the detection signals received from the detectors.

5. The safety detection system of claim 1, wherein said danger source is a movable object.

6. The safety detection system of claim 5, wherein the control device further comprises a direction unit comprising a sensor adapted to detect a movement direction of the movable object, wherein said control device is adapted to determine whether the zone associated with detected target represents a danger zone based on the movement direction of the object, and to identify said detected target as a high risk target or a low risk target based on said danger zone determination.

7. The safety detection system of claim 6, wherein the control device is adapted to transmit a danger signal to the target using the directional RF transceiver associated to the zone in which the target is detected, and wherein the portable target device further comprises an indicator adapted to signal the presence of a danger in response to the danger signal received from the base station RF transceiver.

8. The safety detection system of claim 5, wherein the movable object is a vehicle and the target is a person, and wherein the base station is adapted to be mounted at said vehicle and the portable target device is adapted to be portable by said person.

9. The safety detection system of claim 8, wherein the control device is further adapted to be connected to an ignition system of the vehicle for controlling the ignition system based on the position of the detected target, said controlling comprising deactivating the vehicle.

10. The safety detection system of claim 1, wherein the danger source is a contaminated patient, the target is a person, and wherein the base station is adapted to be mounted at a fixture in proximity of the patient and the portable target device is adapted to be portable by said person.

11. The safety detection system of claim 1, wherein the control device further comprises a display for providing a visual representation of detected targets on said display with their respective positions determined by the control device.

12. The safety detection system of claim 1 further comprising portable target devices adapted to be detected by the detectors of the base station when the devices are located within the zones.

13. The safety detection system of claim 12, wherein the portable target devices are adapted to be portable by targets and wherein each one of the portable target devices comprises an indicator comprising a sensor adapted to change an output state in response to a danger signal received from the base station and to generate an alarm signal in response to the danger signal comprising a sound, a smell, a light, a change of color, an electrical shock or a vibration.

14. The safety detection system of claim 13, wherein each one of the base station detectors comprise a base station RF transceiver and wherein each one of the portable target devices comprises a target RF transceiver adapted to send a response signal in response to a signal received from the base station RF transceiver, the response signal being detectable by the base station RF transceiver and is indicative of presence of a target.

15. The safety detection system of claim 14, wherein the danger source is an industrial vehicle in a construction field and the targets are construction workers.

16. The safety detection system of claim 14, wherein the danger source is a contaminated patient in a medical center and the targets are medical staff.

17. A safety detection system for detecting and signaling a target in a danger zone, the detection system comprising:
  a base station adapted to be positioned at a danger source and comprising:
  a plurality of detectors adapted to cover a plurality of adjacent and mutually exclusive zones forming a single intersection point coinciding with the base station such that each detector has an angular orientation and is adapted to cover an associated single zone only; and
  a control device adapted to signal presence of a detected target within a zone by a detector comprising a position of the detected target with respect to the base station, the control device comprising a memory storing data mapping the detectors to their respective angular orientations, where the mapping data is used by the control device to determine an angular orientation of the detector associated with the detected target as an indication of an angular position of the detected target with respect to the base station, wherein said danger source is a movable object,
  wherein the control device further comprises a direction unit comprising a sensor adapted to detect a movement direction of the movable object, wherein said control device is adapted to determine whether the zone associated with detected target represents a danger zone based on the movement direction of the object, and to identify said detected target as a high risk target or a low risk target based on said danger zone determination.

18. The safety detection system of claim 17, wherein the control device is adapted to transmit a danger signal to the target using the directional RF transceiver associated to the zone in which the target is detected, and wherein the portable target device further comprises an indicator adapted to signal the presence of a danger in response to the danger signal received from the base station RF transceiver.

* * * * *